United States Patent [19]
Rakowsky et al.

[11] 3,982,488
[45] Sept. 28, 1976

[54] FLUERIC THROUGH BULKHEAD ROCKET MOTOR IGNITOR

[75] Inventors: Edward L. Rakowsky, Kinnelon; Vincent P. Marchese, Morris Township, Morris County, both of N.J.

[73] Assignee: The United States of America as represented by the Secretary of the Army, Washington, D.C.

[22] Filed: Feb. 19, 1975

[21] Appl. No.: 551,434

[52] U.S. Cl. .................................. 102/81; 102/49.7
[51] Int. Cl.² ............................................ F42C 5/00
[58] Field of Search .................. 102/70 R, 49.7, 81, 102/27 R; 89/7; 60/256

[56] References Cited
UNITED STATES PATENTS

| | | |
|---|---|---|
| 2,948,219 | 8/1960 | Sapp .................................. 102/27 R |
| 3,159,103 | 12/1964 | Bagley .......................... 102/70 R X |
| 3,209,692 | 10/1965 | Webb .............................. 102/70 R |
| 3,238,876 | 3/1966 | Allen .............................. 102/70 R |
| 3,578,011 | 5/1971 | Holmes ...................... 102/70 R X |
| 3,630,150 | 12/1971 | Rakowsky ..................... 102/70 R |
| 3,630,151 | 12/1971 | Rakowsky ..................... 102/70 R |
| 3,854,401 | 12/1974 | Fisher .............................. 102/81 X |

Primary Examiner—David H. Brown
Attorney, Agent, or Firm—Lawrence A. Neureither; Jack W. Voigt; James T. Deaton

[57] ABSTRACT

A flueric through bulkhead rocket motor ignitor in which a flueric thermal energy generator is used to set off a pyrotechnic/explosive pickup charge that in turn sets off a donor pyrotechnic/explosive charge that transmits its energy through a thick metallic bulkhead that is utilized to maintain pressure integrity of a rocket motor, and the donor charge transmits its energy to a pyrotechnic/explosive pickup charge that in turn sets off a receptor charge that is utilized to ignite a solid propellant composition.

1 Claim, 1 Drawing Figure

U.S. Patent   Sept. 28, 1976   3,982,488
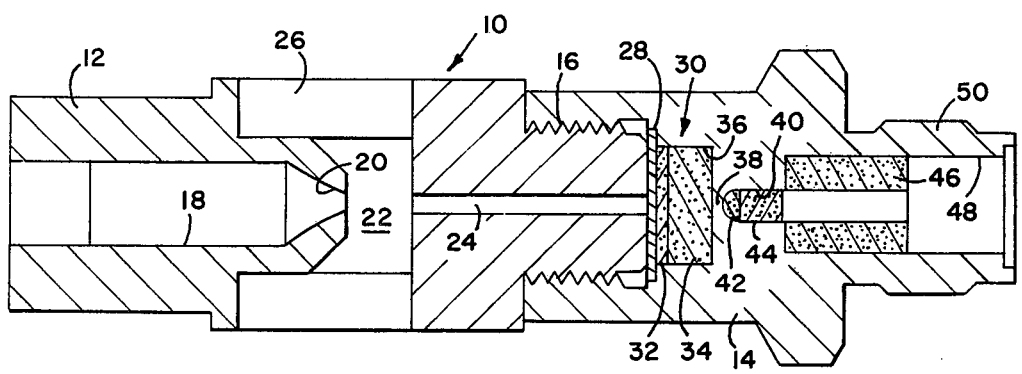

FLUERIC THROUGH BULKHEAD ROCKET MOTOR IGNITOR

BACKGROUND OF THE INVENTION

Usual ignition methods have relied on electrical ignition of the propellant. A typical application is the exploding bridgewire, a thin wire which undergoes resistance heating when subjected to large electrical currents. The hot wire ignites the propellant when in close contact with it. These techniques, which use electrically conducting wires in close proximity to the propellant, are hazardous due to inadvertent currents being caused to flow and prematurely cause ignition of the propellant. These inadvertent currents can be caused from stray electromagnetic energy from various sources that can cause abortion of the particular mission desired. Additional failures may also occur due to rough handling or other mechanical shocks. Therefore, the use of a non-electrical ignition device is needed.

Accordingly, it is an object of this invention to provide a non-electrical ignition device for igniting a solid propellant.

Another object of this invention is to provide a non-electrical device in which no electrical shielding is required to protect it from electromagnetic radiation.

Still another object of this invention is to use a flueric device which eliminates moving parts and utilizes stored energy to cause the propellant to be ignited.

Still another object of this invention is to provide a device that can withstand shock and rough handling.

A still further object of this invention is to provide a device which has resistance to hostile environments faced by advanced weapons systems with the added advantages of being impervious to defensive jamming, being nuclear hard, and having a long storage life with little or no maintenance required.

Other objects and advantages of this invention will be obvious to those skilled in this art.

SUMMARY OF THE INVENTION

In accordance with this invention, a flueric through bulkhead rocket motor ignitor is provided that includes a fluid initiator connected to a housing containing a first charge that is set off by said fluid initiator, a second charge spaced from said first charge through a thick bulkhead and set off by ignition of said first charge, and a propellant composition in said housing and spaced from the second charge so that said second charge upon ignition will cause said propellant to be ignited. With this arrangement, a very sensitive yet very rugged ignition system is provided that is not subject to premature ignition by jamming devices, nuclear devices and electric fields.

BRIEF DESCRIPTION OF THE DRAWING

In the drawing:

The single FIGURE of the drawing is a sectional view of a flueric through bulkhead rocket motor ignitor according to this invention.

DESCRIPTION OF THE PREFERRED EMBODIMENT

Referring now to the drawing, flueric through bulkhead rocket motor ignitor 10 includes a flueric ignitor 12 that is secured to propellant housing 14 by being threaded thereto at 16. Flueric ignitor 12 has an inlet port 18 with a converging nozzle 20 that injects fluid into chamber 22 and resonance tube 24. Fluid from chamber 22 is exhausted through ports 26. A metal closure disk 28 is mounted at one end of fluid ignitor 12 and seals tube 24. A first charge 30 contains pickup charge 32 and donor charge 34 that are mounted in chamber 36 of housing 14. A thick bulkhead section 38 separates chamber 36 from chamber 40 which houses a second charge made up of a pickup charge 42 and a receptor charge 44. A solid propellant 46 is mounted in bore 48 and is ignited by the second charge. Housing 14 has end 50 that is adapted to be connected to an appropriate nozzle or other structure as desired.

In operation, fluid entering inlet port 18 is jetted through nozzle 20 and into resonance tube 24 to cause heating at thin metal closure disk 28. Heating at closure disk 28 causes pickup charge 32 to be ignited which in turn ignites explosive donor charge 34. The igniting of first charge 30 causes sufficient heat and shock to be transmitted through thick bulkhead 38 to cause pickup charge 42 to be ignited and in turn receptor charge 44. The igniting of pickup charge 42 and receptor charge 44 causes solid propellant 46 to be ignited. As can be seen, with this arrangement fluid entering port 18 and exhausted through outlet ports 26 cause flueric ignitor 12 to act as a match for setting off first charge 30 and second charge 42, 44 which in turn ignites solid propellant 46. With this arrangement a safe and reliable rocket motor ignitor is provided and the solid propellant chamber remains sealed from first charge 30 by thick bulkhead section 38 to maintain pressure integrity of the rocket motor.

We claim:

1. A rocket motor ignitor comprising a fluid resonance heating device comprised of a housing having an inlet port that is connected to a converging nozzle that injects fluid into a resonance tube with an open end to produce heating at said open end of said tube and exhaust ports for exhausting fluid from said housing; said heating device being connected to a propellant housing containing a first explosive charge that is in heating relation to said fluid resonance heating device for receiving heat therefrom, said fluid resonance heating device open end and said first explosive charge being separated by a metal closure disk and said first explosive charge being comprised of a first pickup charge adjacent said metal closure disk and a donor charge contiguous said first pickup charge; a second explosive charge mounted in said propellant housing and spaced from said first explosive charge by a thick bulkhead, said second explosive charge being comprised of a second pickup charge adjacent said bulkhead and a receptor charge contiguous said second pickup charge; and a solid propellant mounted in said housing adjacent said second explosive charge for being ignited thereby.

* * * * *